United States Patent
Kooima et al.

(10) Patent No.: US 9,326,445 B1
(45) Date of Patent: May 3, 2016

(54) COMPOSITE HARVESTER SPOUT

(71) Applicants: Phil Kooima, Rock Valley, IA (US);
Dale Vanden Top, Hull, IA (US)

(72) Inventors: Phil Kooima, Rock Valley, IA (US);
Dale Vanden Top, Hull, IA (US)

(*) Notice: Subject to any disclaimer, the term of this patent is extended or adjusted under 35 U.S.C. 154(b) by 0 days.

(21) Appl. No.: 14/799,737

(22) Filed: Jul. 15, 2015

Related U.S. Application Data

(63) Continuation-in-part of application No. 13/898,089, filed on May 20, 2013, now Pat. No. 9,198,350.

(60) Provisional application No. 62/158,607, filed on May 8, 2015.

(51) Int. Cl.
- A01D 57/00 (2006.01)
- B65G 67/04 (2006.01)
- B65G 67/06 (2006.01)
- A01D 43/08 (2006.01)

(52) U.S. Cl.
CPC .................................. *A01D 43/087* (2013.01)

(58) Field of Classification Search
None
See application file for complete search history.

(56) References Cited

U.S. PATENT DOCUMENTS

| | | | |
|---|---|---|---|
| 3,136,401 A | 6/1964 | Atanasoff | |
| 4,233,802 A | 11/1980 | Booth | |
| 5,952,219 A | 9/1999 | Zamoyski | |
| 6,939,222 B2* | 9/2005 | Grossjohann | A01D 43/087 460/114 |
| 2012/0316737 A1* | 12/2012 | Missotten | A01D 43/087 701/50 |
| 2013/0305678 A1* | 11/2013 | Clauss | A01D 43/10 56/16.4 C |

* cited by examiner

Primary Examiner — Kavel Singh
(74) Attorney, Agent, or Firm — Jeffrey A. Proehl; Woods, Fuller, Schultz & Smith, P.C.

(57) ABSTRACT

A composite discharge spout portion for a discharge spout for a forage harvester defines at least a portion of a path for crop materials. The spout portion may include a proximal end, a distal end, an upper wall and a pair of side walls extending between the proximal end and distal end. The side walls depend from the upper wall, and the top and side walls have opposite major faces and edges. A spine may be integrated into each of the side walls and extends between the proximal and distal ends, with each of the spines forming a tubular structure on either side of the spout portion. The upper wall, the side walls and the spines may be integrally formed of a composite material.

12 Claims, 22 Drawing Sheets

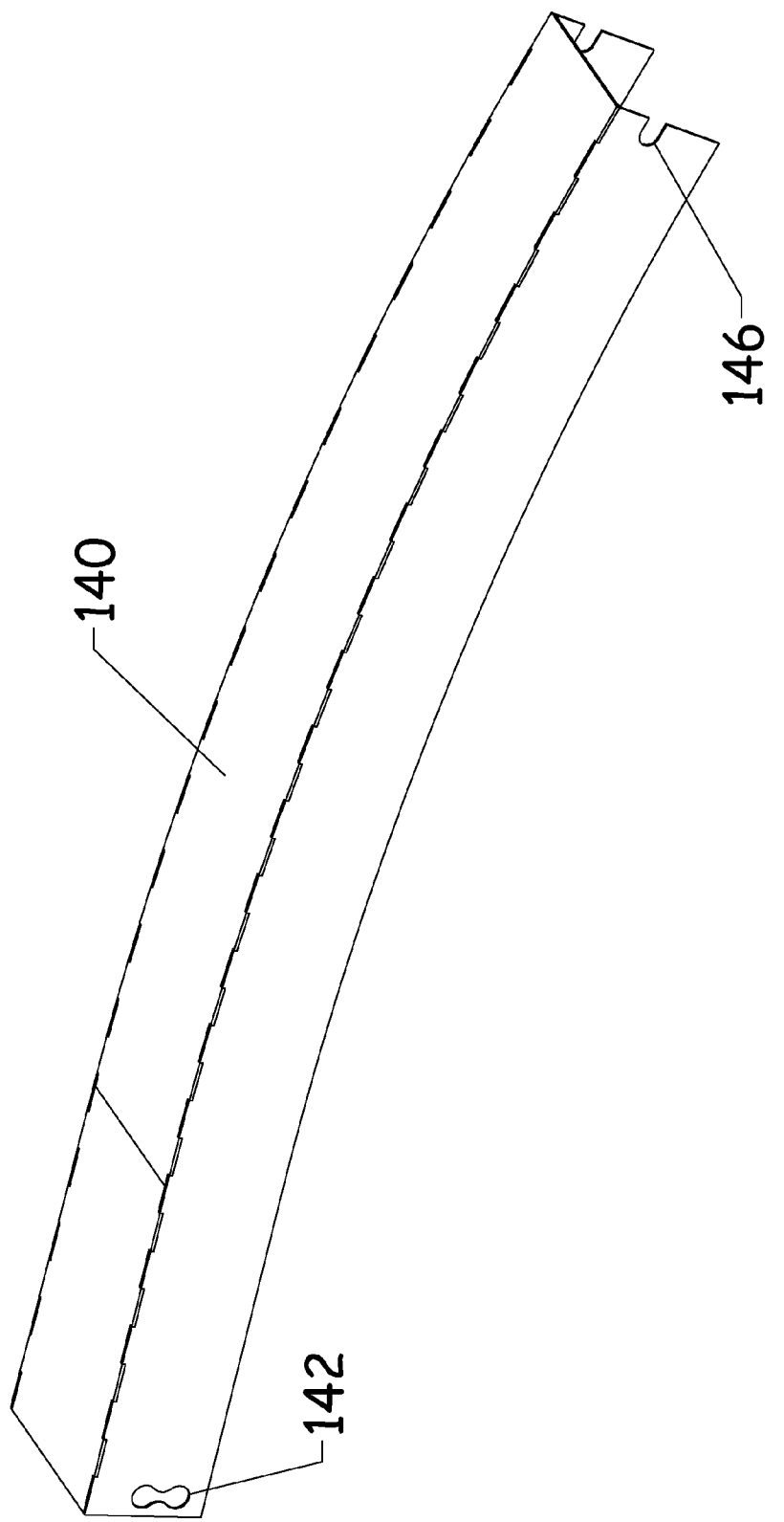

COMPOSITE HARVESTER SPOUT

REFERENCE TO RELATED APPLICATION

This application claims the benefit of U.S. provisional patent application No. 62/158,607, filed May 8, 2015, and is a continuation-in-part of U.S. patent application Ser. No. 13/898,089, filed May 20, 2013, both of which are hereby incorporated by reference in their entireties.

BACKGROUND

Field

The present disclosure relates to crop harvesting equipment and more particularly pertains to a new harvester dispensing spout formed at least in part from composite materials.

SUMMARY

In one aspect, the disclosure relates to a composite discharge spout portion for a discharge spout for a forage harvester which defines at least a portion of a path for crop materials. The spout portion may include a proximal end, a distal end, and an upper wall and a pair of side walls extending between the proximal end and distal end. A spine may be integrated into each of the side walls and extends between the proximal and distal ends, with each of the spines forming a tubular structure on either side of the spout portion. The upper wall, the side walls and the spines may be integrally formed of a composite material.

In another aspect, the disclosure relates to a discharge spout for a forage harvester having an exit conduit through which crop materials move. The spout may comprise a spout base portion forming an inboard end of the spout and being configured to mount on the forage harvester in communication with the exit conduit. A composite spout portion may be mounted on the spout base portion, and may have having a proximal end mounted on the base portion and a distal end. The composite spout portion may include an upper wall and a pair of side walls depending from the upper wall. A spine may be integrated into each of the side walls and extends between the proximal and distal ends, with each of the spines forming a tubular structure on either side of the spout portion. The upper wall, the side walls and the spines may be integrally formed of a composite material.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 19 is a schematic perspective view of an embodiment of the sacrificial liner for a portion of the spout, according to an illustrative embodiment.

DETAILED DESCRIPTION

Figure 1:
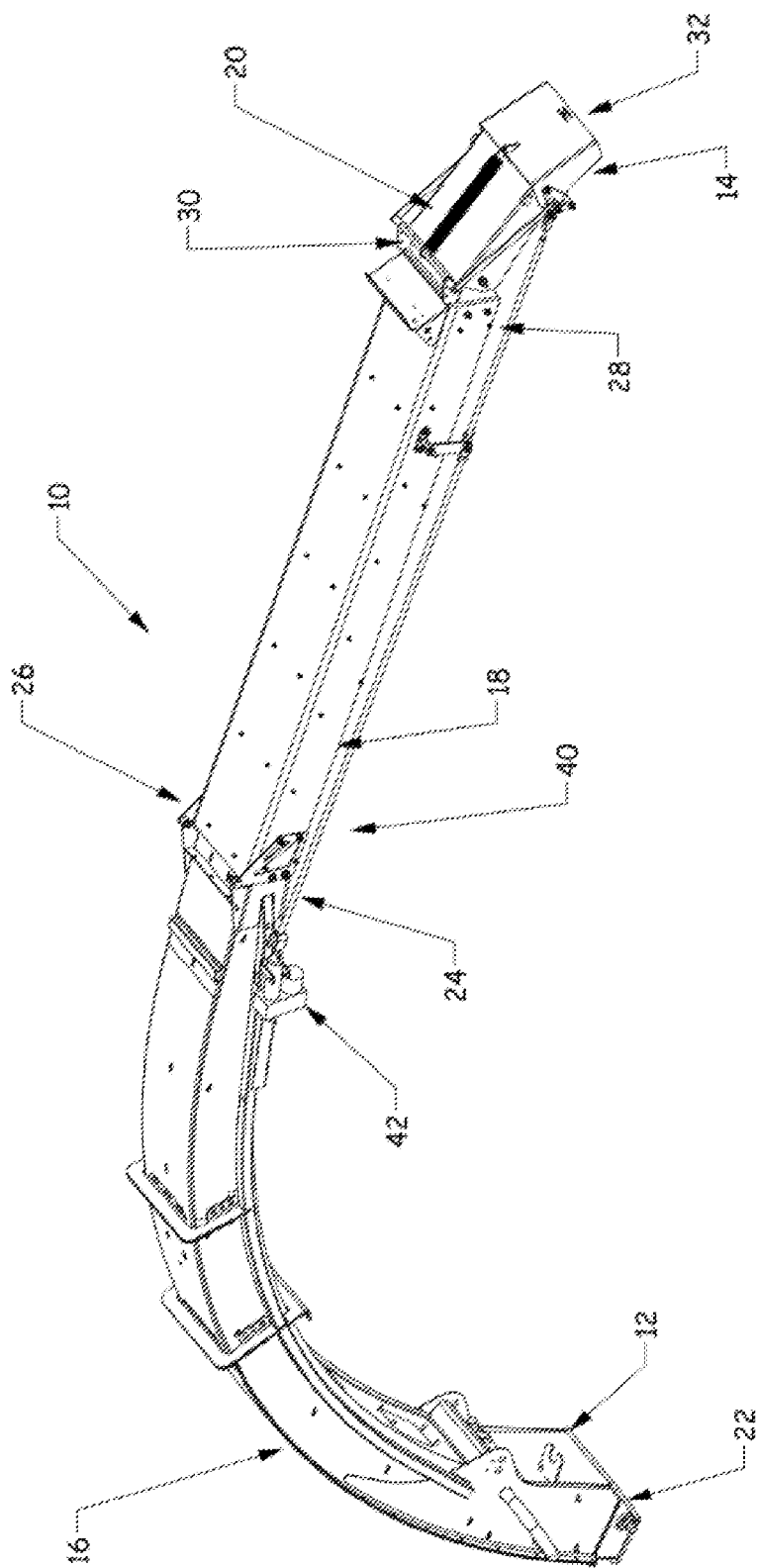
FIG. 1 is a schematic perspective view of a new extended harvester spout according to the present disclosure.
Figure 2:
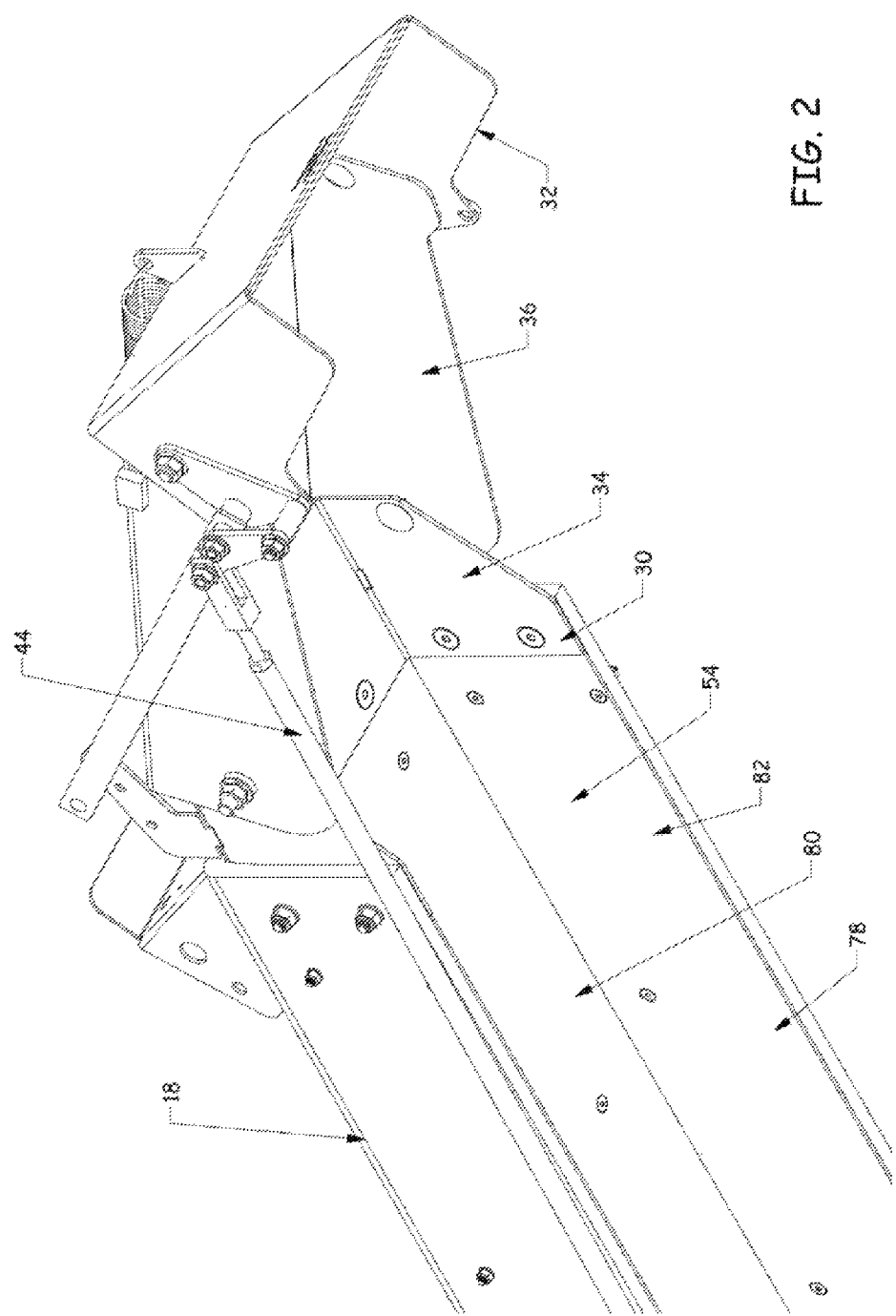
FIG. 2 is a schematic perspective view of an outboard end portion of the dispensing spout, according to an illustrative embodiment.
Figure 3:
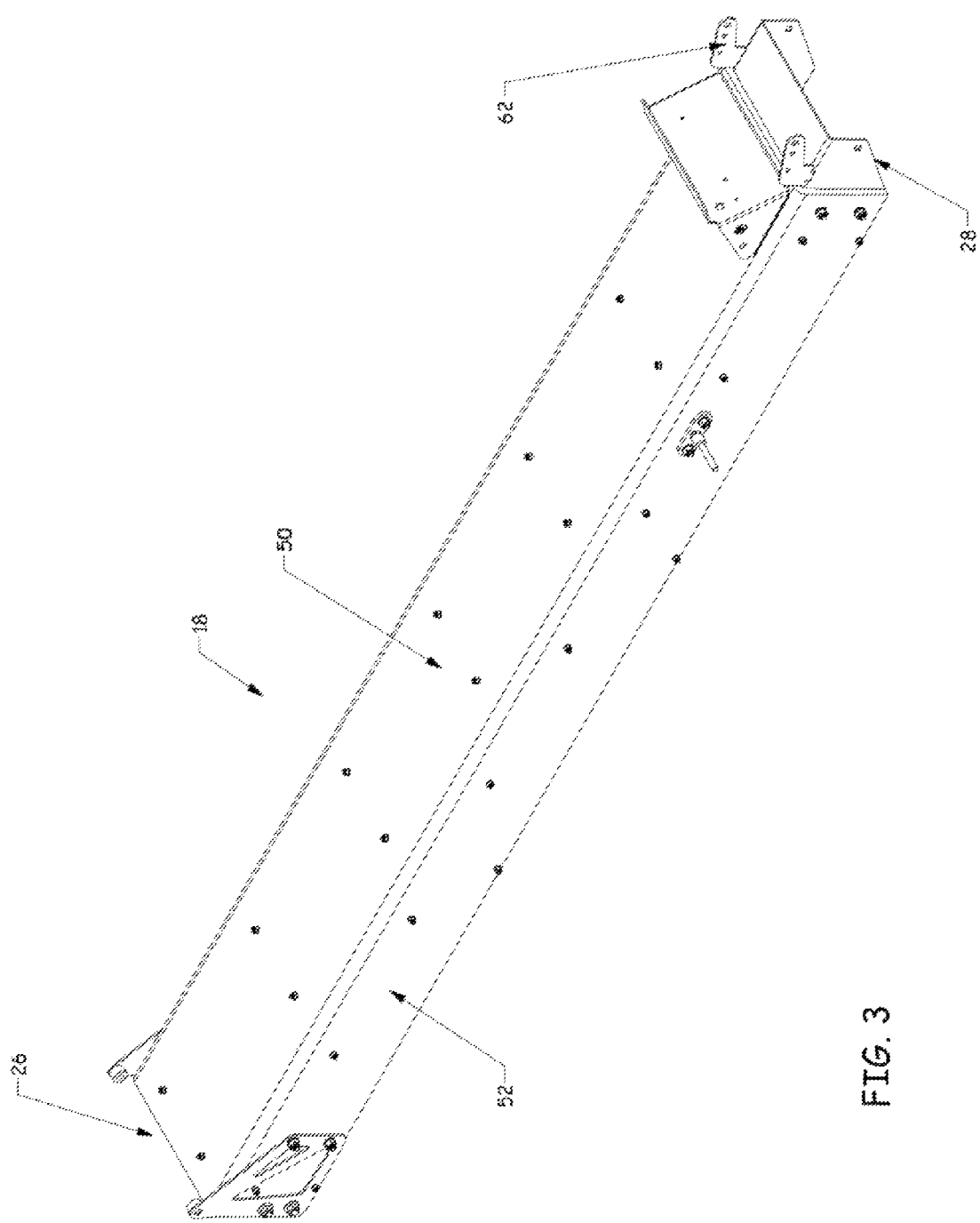
FIG. 3 is a schematic upper perspective view of the spout extension portion of the dispenser spout, according to an illustrative embodiment.
Figure 4:
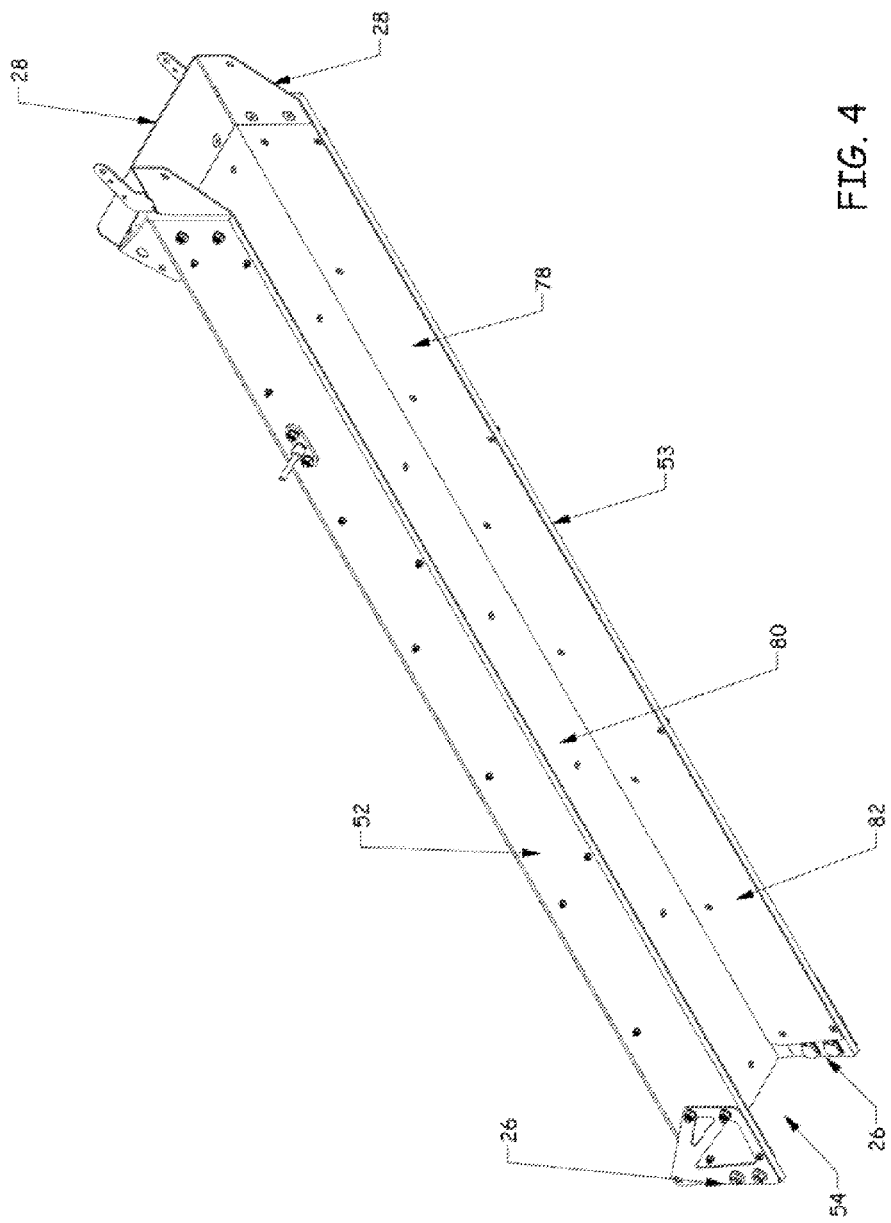
FIG. 4 is a schematic lower perspective view of the spout extension portion of the dispenser spout, according to an illustrative embodiment.
Figure 5:
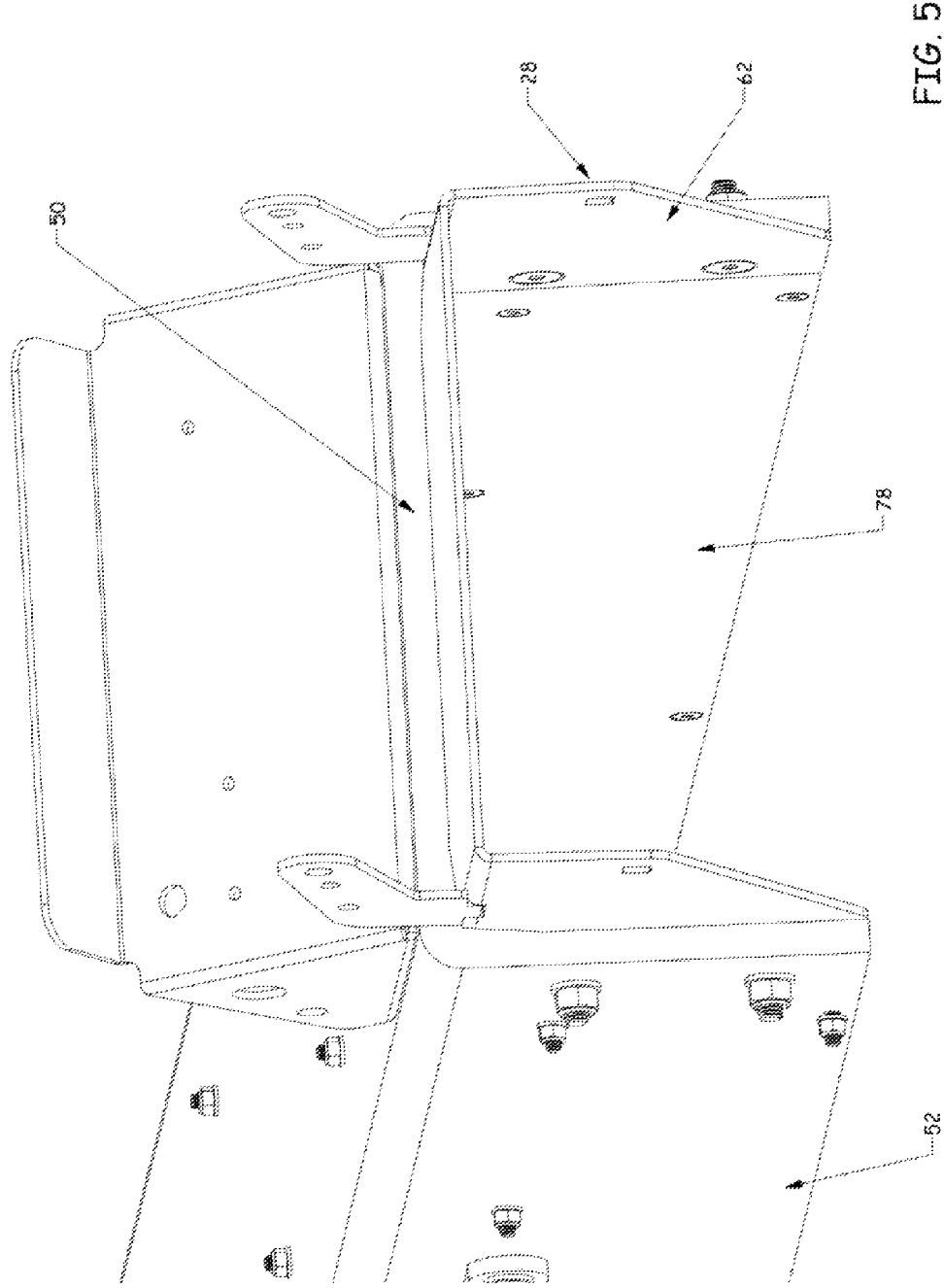
FIG. 5 is a schematic perspective view of an end section of the spout extension portion, according to an illustrative embodiment.
Figure 6:
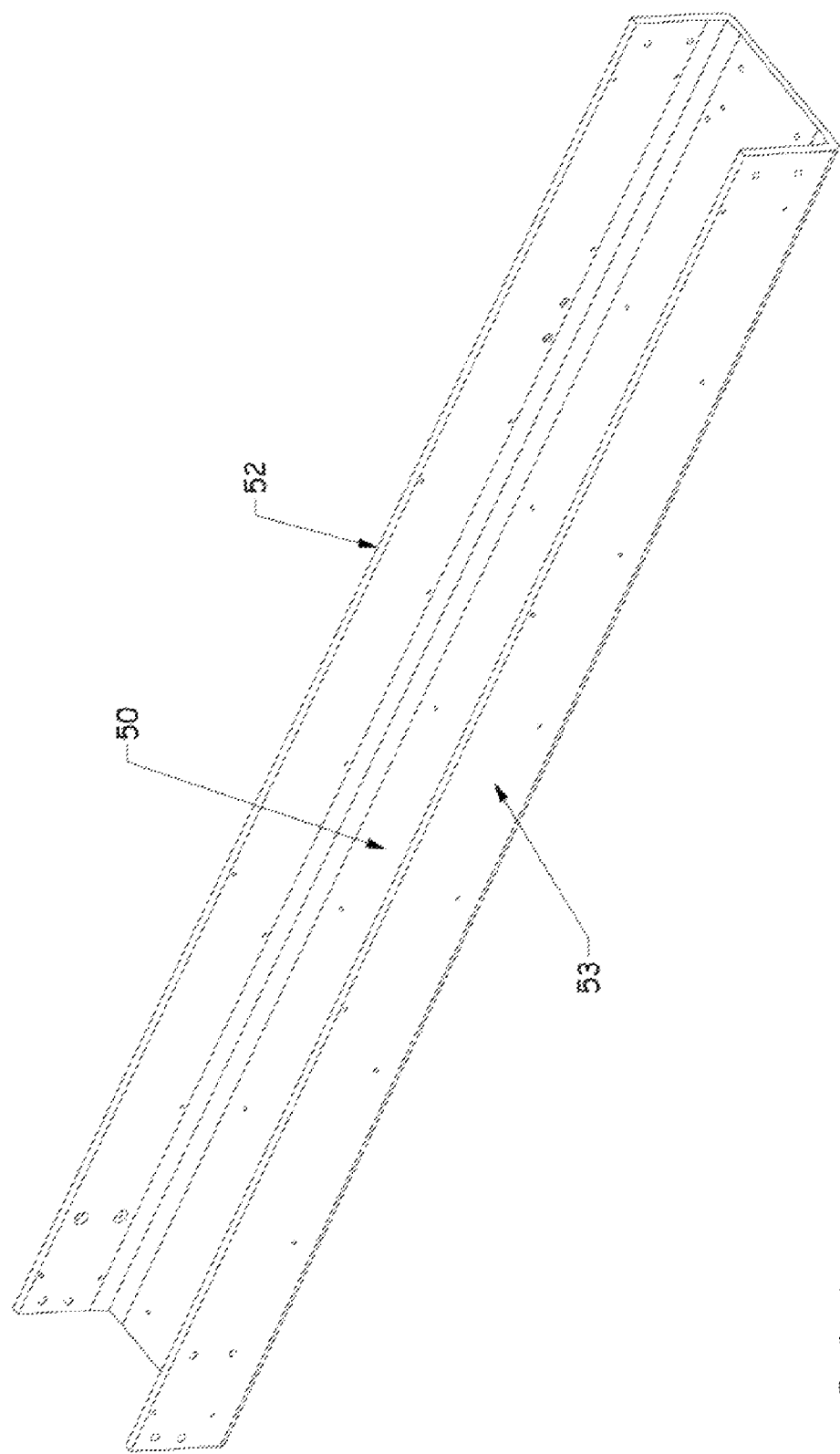
FIG. 6 is a schematic perspective view of the spout composite portion, according to an illustrative embodiment, shown with other elements removed and in an inverted position to reveal detail.
Figure 7:
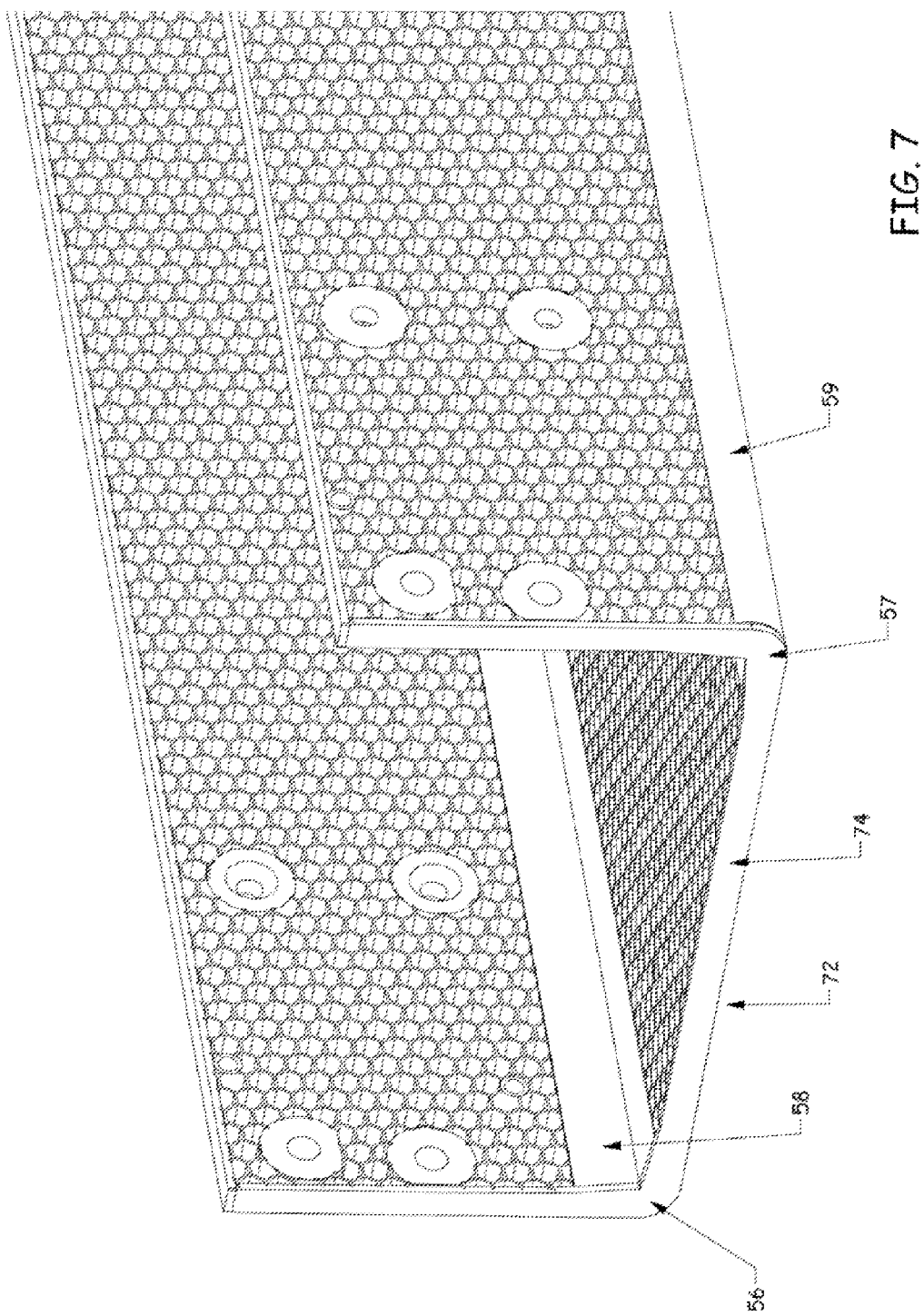
FIG. 7 is a schematic perspective view of an end section of the spout composite portion, according to an illustrative embodiment, shown with the outer skin removed to reveal the celled structure and the edge reinforcement structures.
Figure 8:
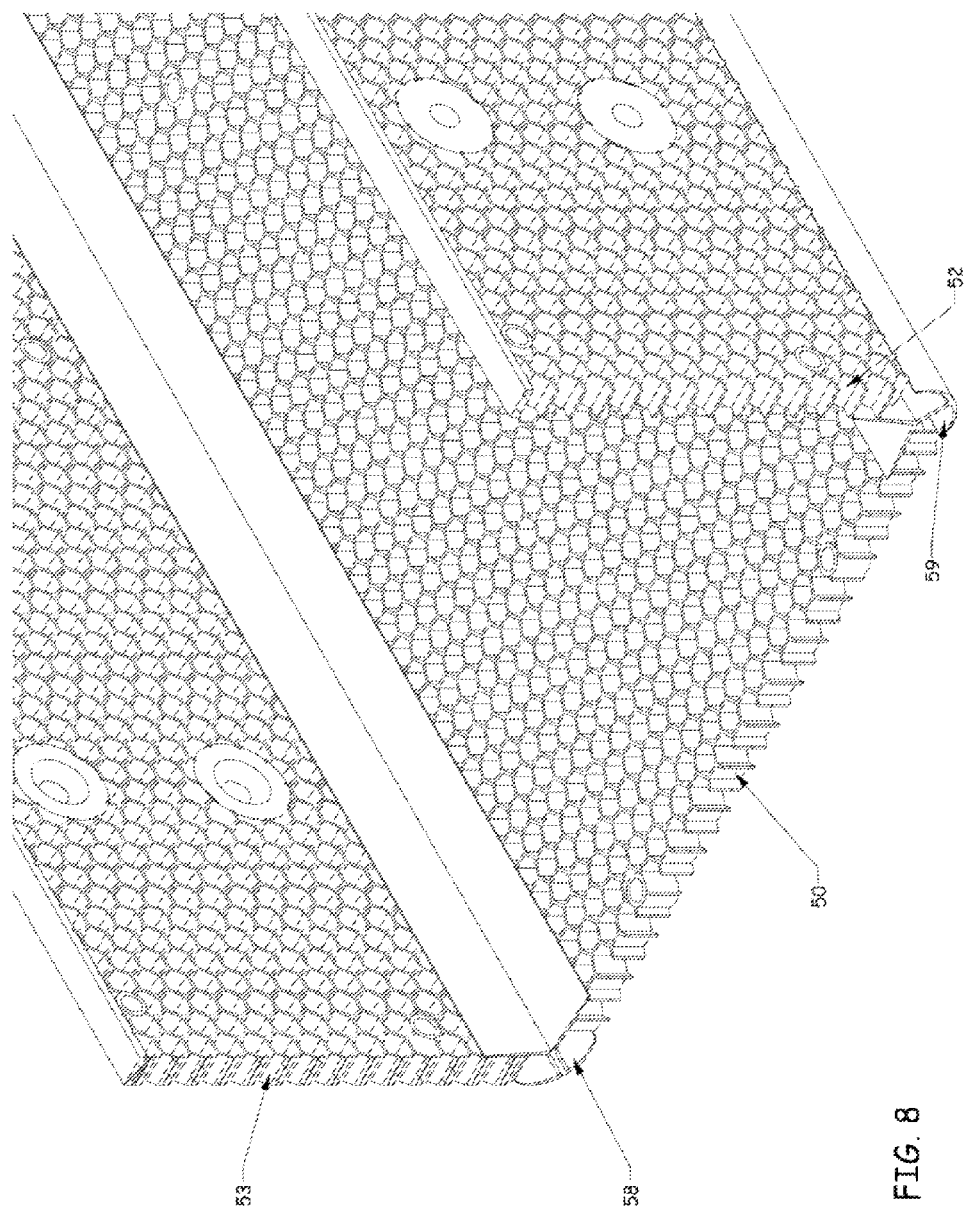
FIG. 8 is a schematic perspective sectional view of the spout composite portion, according to an illustrative embodiment, also shown with the outer skin removed to reveal the celled structure and the joining elements as well as the edge reinforcement structures.
Figure 9:
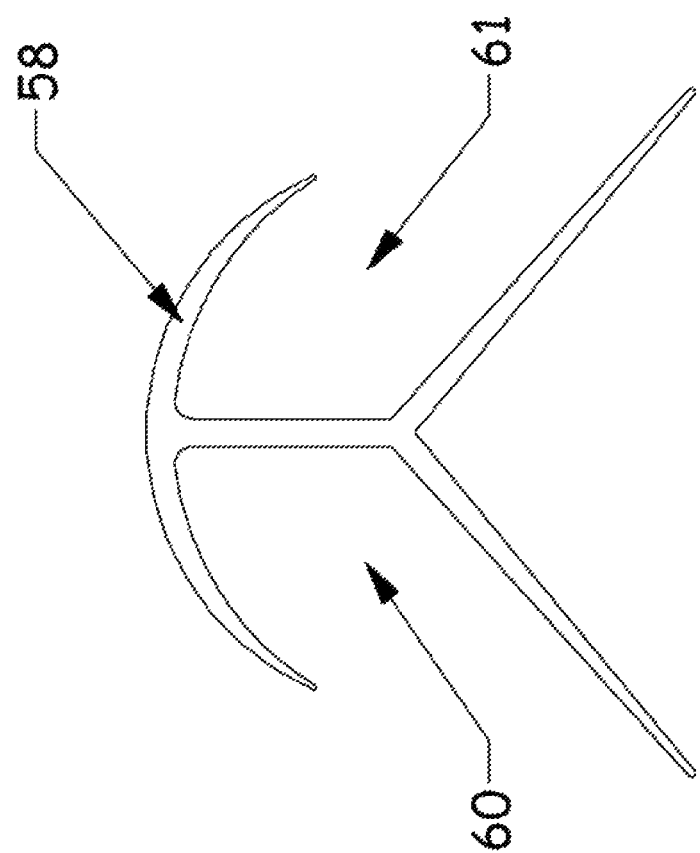
FIG. 9 is a schematic sectional view of a joining element, according to an illustrative embodiment.
Figure 10:
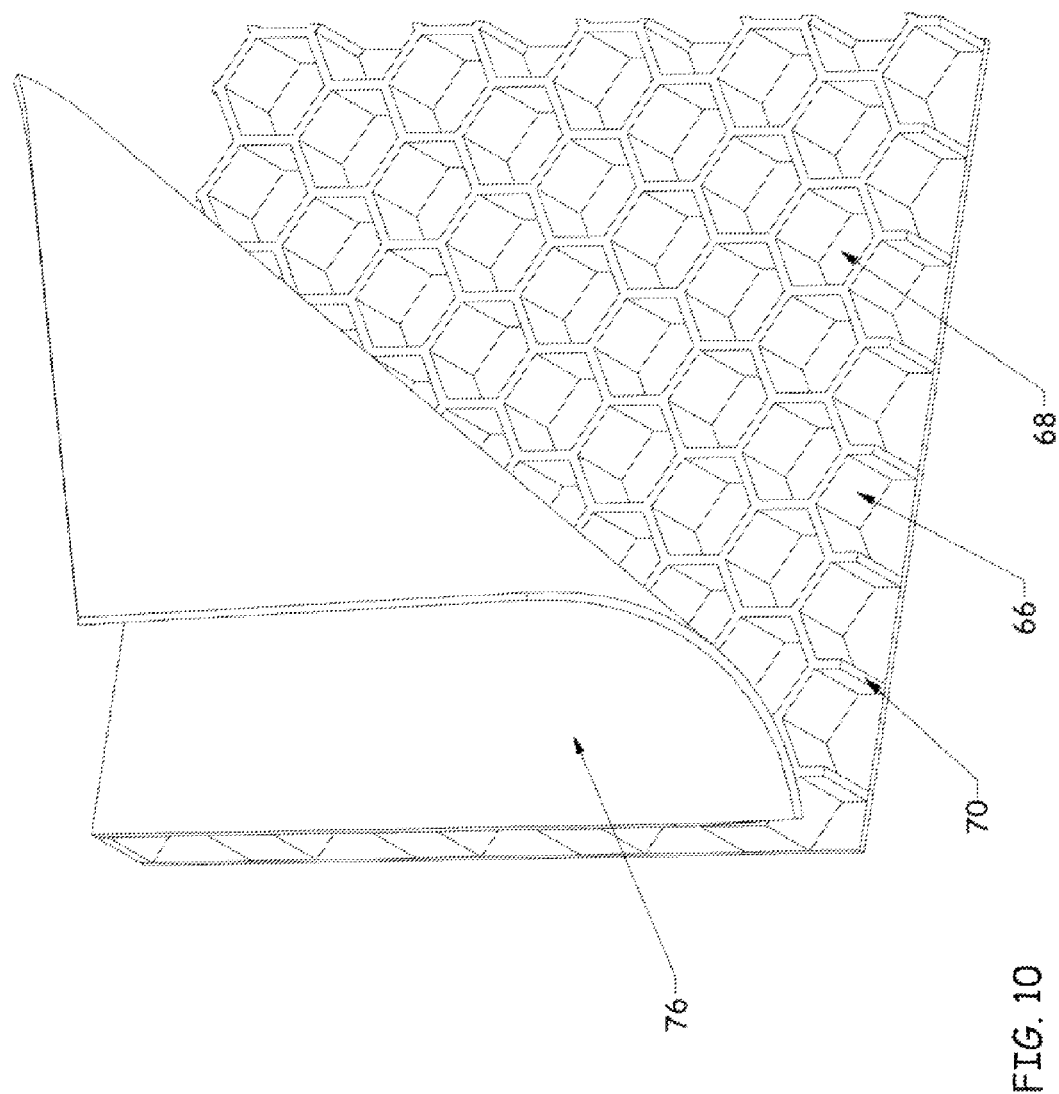
FIG. 10 is a schematic perspective view of a broken away piece of the composite portion with the outer skin peeled back from one side of the celled structure.
Figure 11:
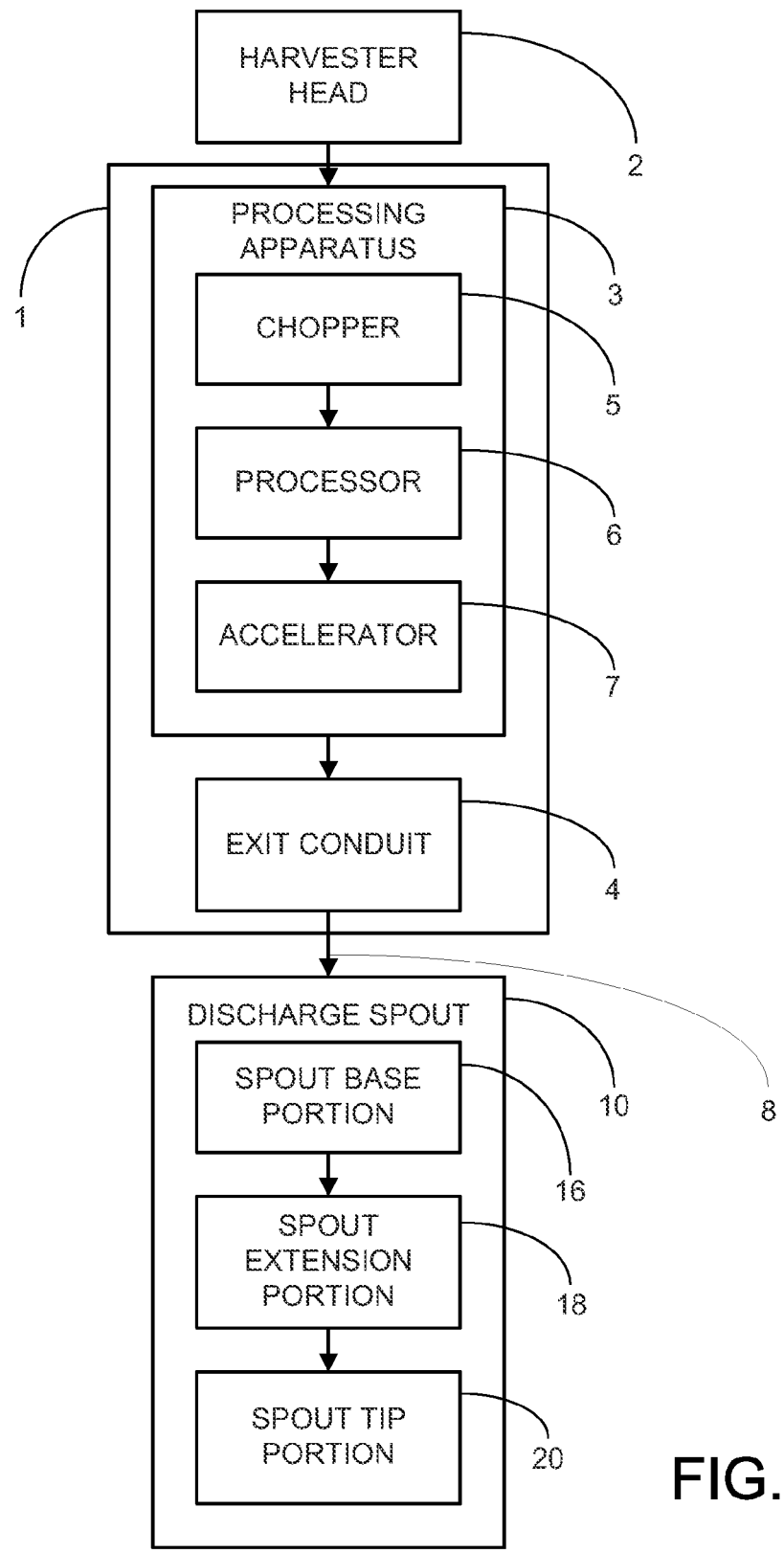
FIG. 11 is a schematic diagram of elements of a system according to an illustrative embodiment.
Figure 12:
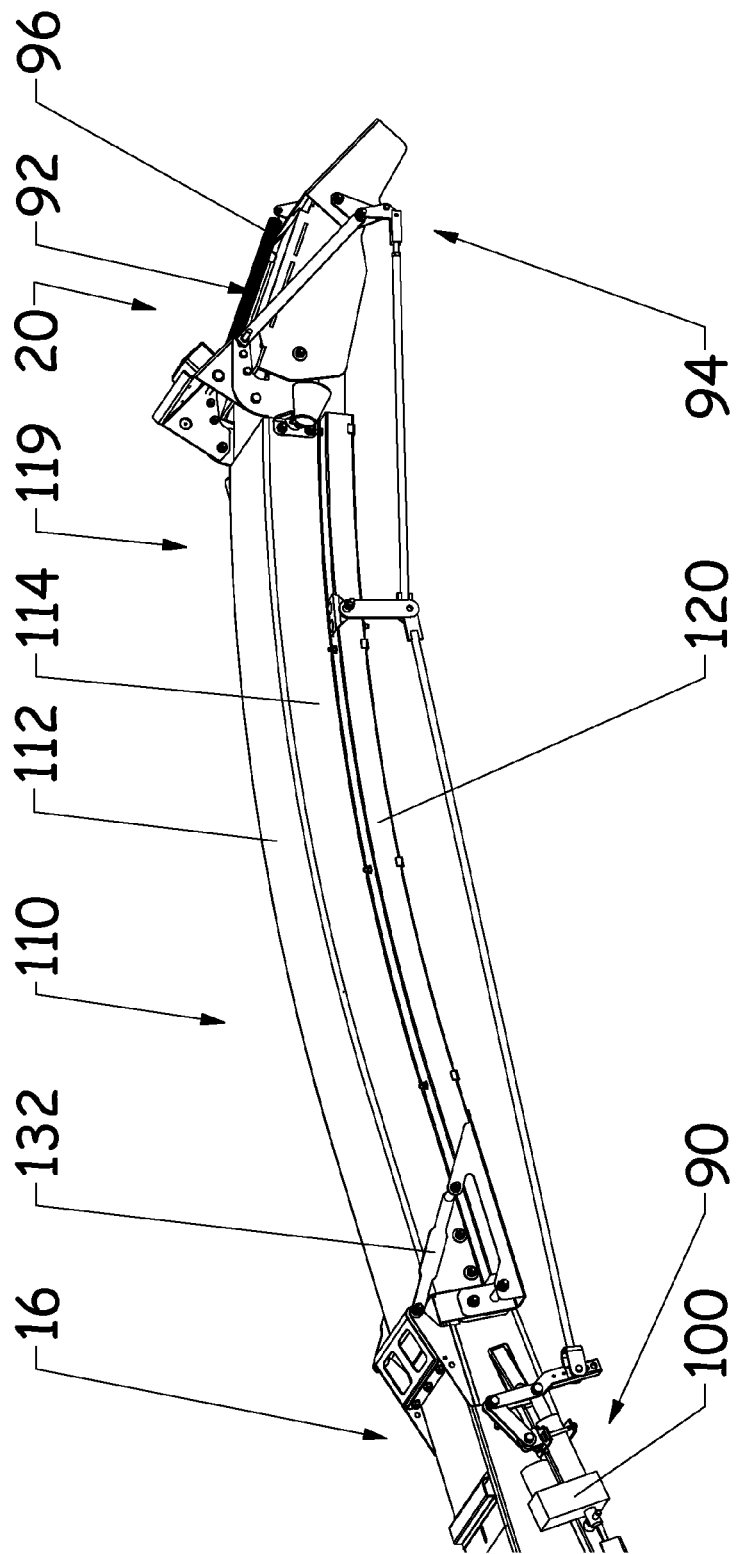
FIG. 12 is a schematic upper perspective view of an embodiment of an extended harvester spout having optional features.
Figure 13:
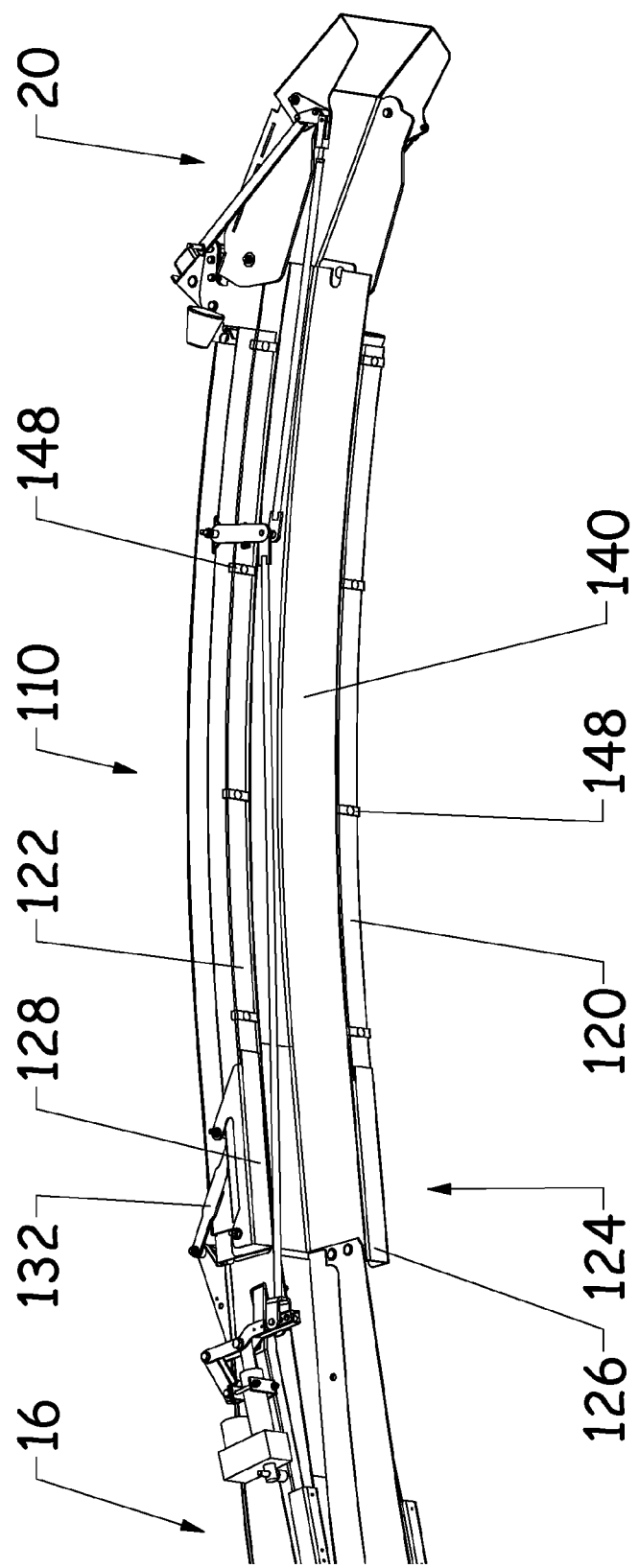
FIG. 13 is a schematic lower perspective view of the spout, according to an illustrative embodiment similar to that shown in FIG. 12.
Figure 14:
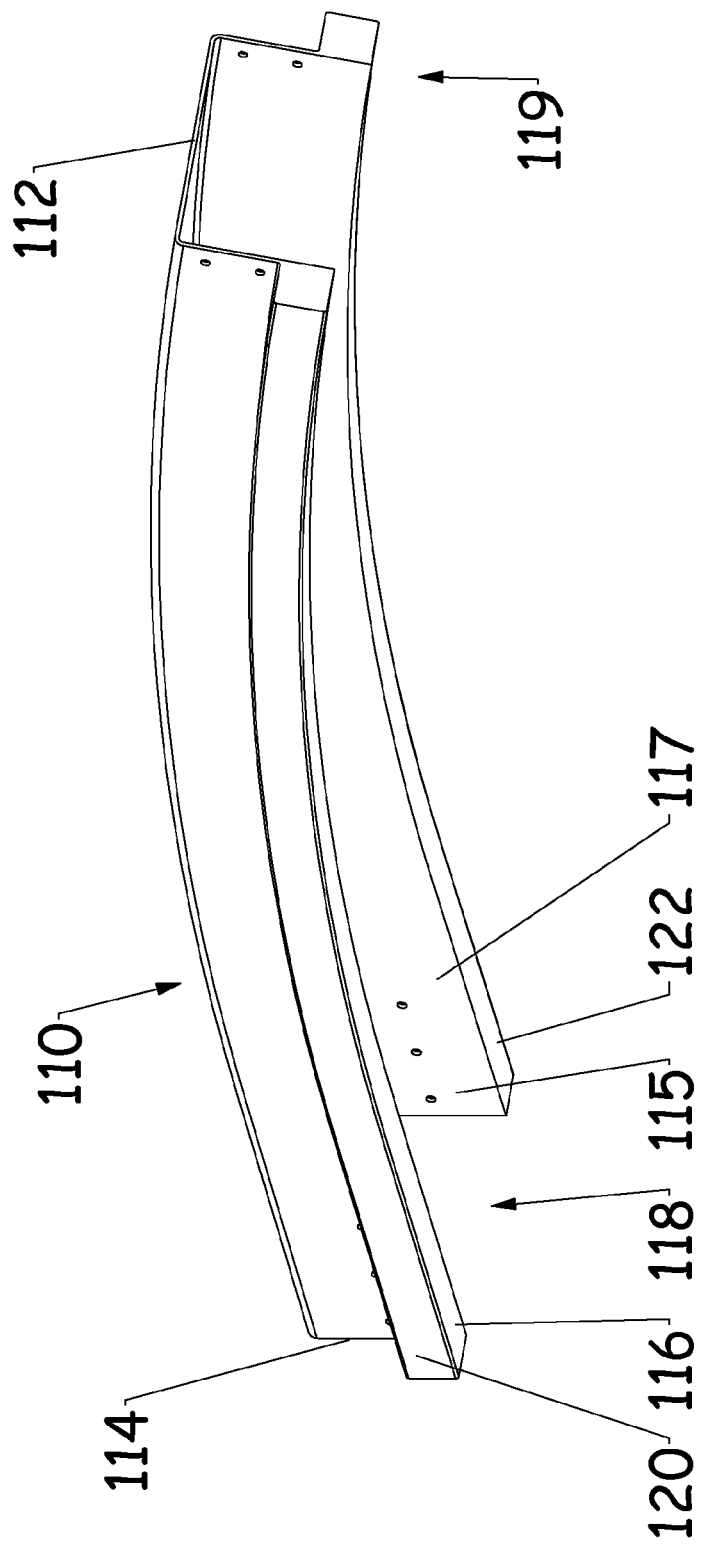
FIG. 14 is a schematic perspective view of the walls of the extension portion of a spout, according to an illustrative embodiment similar to that shown in FIG. 17.
Figure 15:
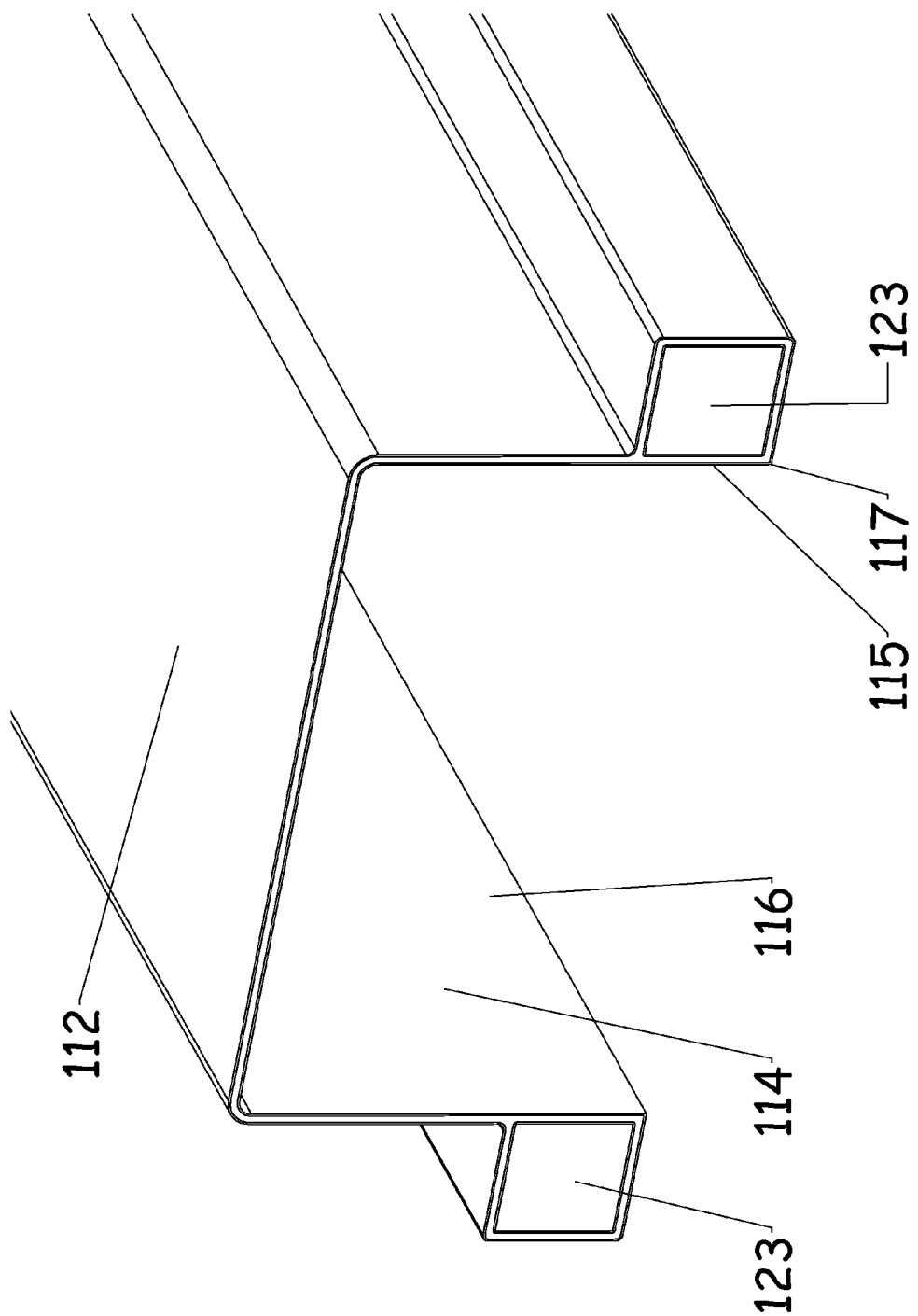
FIG. 15 is a schematic close up perspective view of a cross section of the walls of the extension portion of the spout, according to an illustrative embodiment similar to that shown in FIG. 17.
Figure 16:
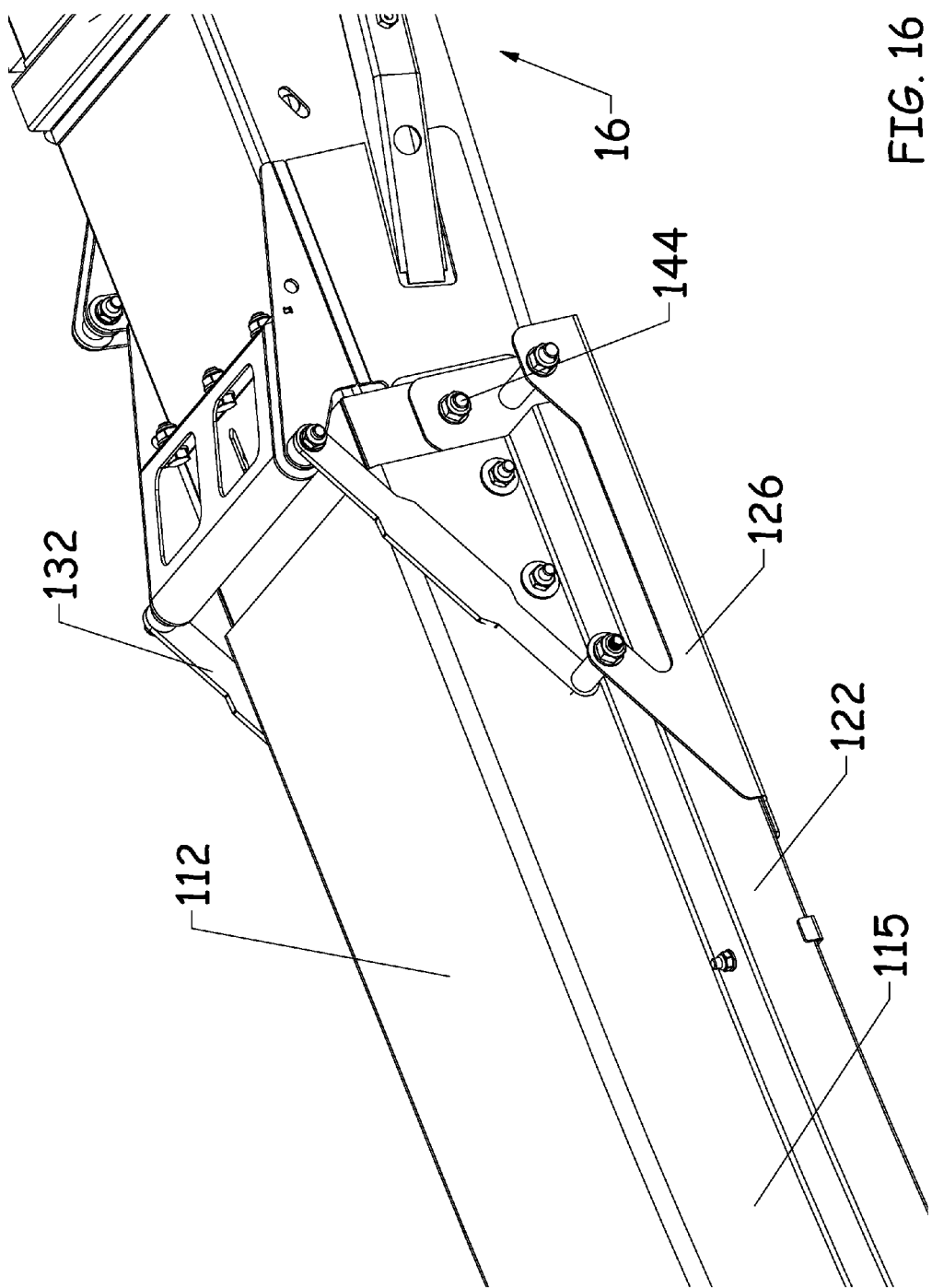
FIG. 16 is a schematic perspective view of an exterior of the mounting structure on the extension portion of the spout, according to an illustrative embodiment similar to that shown in FIG. 17.
Figure 17:
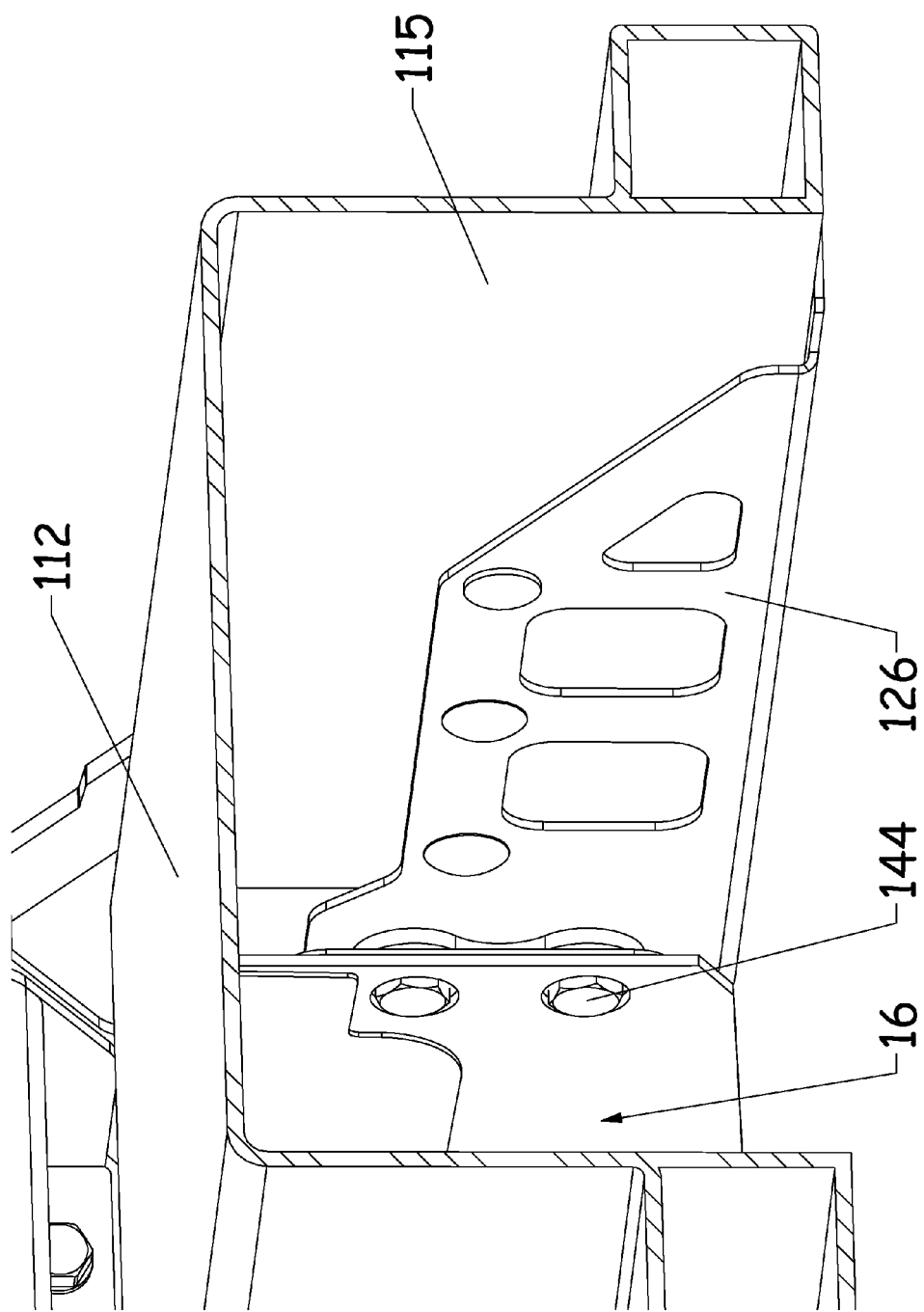
FIG. 17 is a schematic perspective view of an interior of the mounting structure on the extension portion of the spout, according to an illustrative embodiment similar to that shown in FIG. 17.
Figure 18A:
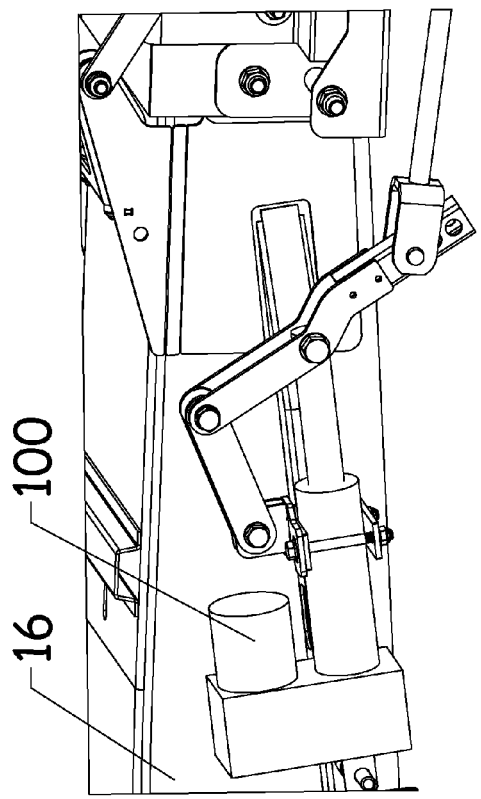
FIG. 18A is a schematic outer perspective view of an actuator assembly, according to an illustrative embodiment, shown in an position that may correspond to an extended position of the tip portion.
Figure 18B:
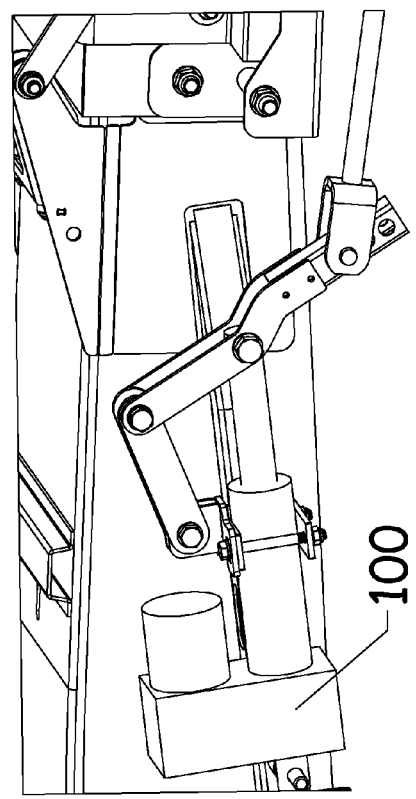
FIG. 18B is a schematic outer perspective view of an actuator assembly, according to an illustrative embodiment, shown in an position that may correspond to a deflection position of the tip portion.

With reference now to the drawings, and in particular to FIGS. 1 through 22 thereof, a new extended harvester spout embodying the principles and concepts of the disclosed subject matter will be described.

Applicants have recognized that as the harvester heads of forage harvesters have gotten wider in order to cut more crop rows in a pass, the distance between the forage harvester and the hopper into which the crop materials are dispensed (whether mounted on a vehicle or on a trailer) has necessarily increased to clear the end of the wider harvester head. A spout is generally used to guide the crop materials from the exit chute of the harvester to the hopper. The increased distance between harvester and hopper means that the spout needs to be longer to reach the increased distance so that crop materials are not lost, such as by blowing wind that may divert the materials streaming from the end of the spout. The closer the end of the spout is to the interior of the hopper, the less chance for loss. Spout extensions may be used to increase the length of the spout to extend the distance from the harvester to the hopper, thus minimizing the possibility of the vehicle associated with the hopper striking the harvester or the harvester head.

Applicants have also recognized that while extending the spout length solves some problems, such extension introduces new problems. Simply extending the spout using conventional spout structures increases the cantilevered weight of the spout significantly, and deflection of the end of the spout increases dramatically. This deflection in turn results in crop materials being directed by the end of the spout in an inconsistent manner as the harvester travels over uneven field surfaces which induces a bounce in the extended spout, which is most pronounced at the dispensing end of the spout. The delivery of the crop materials becomes inconsistent and even uncontrollable. Further, the increased movement resulting from the increased weight also tends to cause premature failure of the spout as the metal of the spout bends after repeated cycles of this bounce.

Applicants have recognized that forming a portion of the spout from a lighter weight material, and in particular a combination of lighter weight and heavier weight materials, may provide a combination that is lighter in weight overall but retains the strength required in a relatively economical manner. In some embodiments, the disclosed composite spout extension, with associated hardware, may have a weight that is approximately ⅓ of the weight of an equivalent extension formed of steel.

In some aspects, the disclosure relates to a system that may include a forage harvester 1 that may include a harvesting head 2 to cut and gather the crop in the field that flows through the harvester as crop materials and a crop processing apparatus 3 for altering the form of the crop materials and ejecting the crop materials through an exit conduit 4 of the harvester. The crop processing apparatus 3 may include a chopper 5 configured to chop the crop materials into pieces, a processor 6 configured to rupture kernels in the crop materials, and an accelerator 7 configured to propel the crop materials through the exit conduit. Forage harvesters may include some or all of these components, and may or may not be self-propelled. The components of the forage harvester and additional elements may define a path 8 for the crop materials being harvested.

Another aspect of the system may include a discharge spout 10 that is configured to discharge crop materials from the crop processing apparatus 3, and the discharge spout may thus be in communication with the exit conduit 4. The discharge spout 10 may have an inboard end 12 for receiving the crop materials from the exit conduit and an outboard end 14 that dispenses or discharges the moving crop materials in the desired direction. The discharge spout 10 may define a portion of the path 8 for crop materials between the inboard and outboard ends. The inboard end 12 may be connected to the exit conduit 4, and in some embodiments, the spout 10 is fully supported by the connection at the exit conduit. Typically, although not necessarily, the spout 10 is rotatable about a vertical axis to change the side of the forage harvester that the spout outputs the crop materials.

In general, the spout 10 may comprise a spout base portion 16, a spout extension portion 18, and a spout tip portion 20. Any and all portions of the discharge spout may be formed of a composite of materials as is described herein. For the purposes of this description, the composite construction of one portion of the discharge spout will be described with the understanding that the use of the composite construction is not limited to one, or one particular, portion of the spout, In greater detail, the spout base portion 16 may be in communication with the crop processing apparatus 3 of the forage harvester through the exit conduit 4, and the crop processing apparatus may eject crop materials through the exit conduit and into the spout base portion. The spout base portion 16 may define an arcuate portion of the path 8 of the crop materials, and the velocity of the crop materials along with the curvature of the base portion 16 may allow the portion 16 to be partially open toward the center of the curvature. The spout base portion 16 may have an inner end 22 and an outer end 24, and the inner end may be connected to the exit conduit 4.

The spout extension portion 18 may be mounted on the spout base portion to extend the path 8 of the crop materials defined by the spout 10. The spout extension portion 18 may have a proximal end 26 and a distal end 28, with the proximal end being connected to the outer end 24 of the spout base portion to receive the crop materials. The extension portion 18 may be removably connected to the base portion 16 in order to allow for use of the spout 10 with and without the extension portion. In some of the more preferred embodiments, the spout extension portion 18 defines a substantially straight portion of the path 8 of crop materials, although this is not critical and may also be curved. An illustrative embodiment of the spout extension portion shown in FIGS. 12 through 14 has an arcuate extent between the ends of the extension portion such that a middle portion deviates from a linear and straight path between the ends. The arcuate shape may allow the crop materials to follow a more natural path when being propelled through the spout.

The spout tip portion 20 may form the outboard end 14 of the discharge spout, and may be mounted on the spout extension portion 18 to continue the path 8 of the crop materials. The spout tip portion 20 may be adjustable to adjust the direction of the crop materials leaving the discharge spout 10, and the adjustment is typically in a vertical plane although adjustment in the horizontal plane may also be possible. The spout tip portion 20 may have a connection end 30 and a free discharge end 32. The free discharge end 32 may be movable with respect to the connection end 30 to adjust the path of the crop materials moving through the spout tip portion, as well as after the crop materials have exited the free end.

In some embodiments, the spout tip portion 20 may include a substantially stationary section 34 including the connection end 30 of the spout tip portion to connect to the spout extension portion. The spout tip portion may also include a movable section 36 that is movably mounted on the stationary section 34, and in some embodiments, the movable section may be pivotable with respect to the stationary section via a pivotal mounting the movable section on the stationary section. In some further embodiments, the movable section includes two or more parts that are articulated with respect to each other, including an outermost tip section 38 and an intermediate section 39 between the tip section 38 and the stationary section 34. The sections of the spout tip portion may be formed of various materials, such as metal or various plastics or composite materials. In some embodiments, it has been found advantageous to utilize a metal (e.g., steel) material for the tip section 38 to avoid excessive bending of the tip portion, and an UHMW material for the intermediate section 39 to provide a degree of weight reduction of the tip portion 20.

In some implementations, an extended spout actuator assembly 40 that is configured to move a part or parts of the movable section 36 of the spout tip portion to direct the crop materials dispensed from the discharge spout. In illustrative embodiments the actuator assembly may comprise an actuator 42 mounted on the base spout portion 16, and may be located toward the outer end of the base spout portion. Illustratively, the actuator 42 may comprise any suitable actuator that extends and retracts, such as a linear actuator. The actuator assembly 40 may also include an actuating link 44 that links the actuator 42 to the movable section 36 (or structure associated with the movable section) of the spout tip portion. The actuating link 44 may extend along at least a portion of the spout extension portion 18. The actuating link 44 of the actuator assembly 40 may comprise a first portion 46 and a second portion 47, and the portions 46, 47 may be connected to a transfer arm 48 that is pivotally mounted on the spout extension portion. An optional embodiment of the extended harvester spout shown in FIGS. 20 through 22 also utilizes a substantially rigid member 44 as well as portions 46, 47 and the transfer arm 48.

In other implementations, an actuator assembly 90 for moving a part or parts of the spout tip portion may employ a biasing element 92 to bias the part or parts toward one position of the tip portion and a movement element 94 that is configured to move the tip portion from the biased position of the tip portion. In the illustrative embodiments shown in FIGS. 12, 13 and 18A-B, the biasing element 94 may include one or more biasing springs 96 that move the tip portion toward the biased position, which may be an extended position which tends to direct the crop materials to exit the spout in a more linear path from the end of the spout, such as along a tangent to the distal end of the spout extension portion 18.

The biasing spring or springs may be connected to the spout extension portion and to a movable part of the tip portion. The movement element 94 may comprise a cable 98 (or other relatively flexible member) that is attached to the structure of the tip portion at a location spaced from the pivot axis mounting of the tip portion such that withdrawal of the cable toward the inboard end of the spout tends to move the tip toward a deflecting position in which the crop materials are diverted or deflected from the tangential path of the extended position, and typically more in a downward direction as compared to the extended position. Operation of the actuator assembly 90 may include movement of the cable 98 by an actuator 100 (see FIG. 18B) toward the inboard end of the spout to a variable degree which results in a variable degree of movement of the tip portion, and a variable degree of deflection of the tip portion. Relaxation of the pull on the cable by the actuator (see FIG. 18A), which allows the cable to move toward the outboard end of the spout, allows the tip portion to move toward the extended position under the influence of the biasing springs. The actuating assembly utilizing the spring and cable combination is highly suitable for use in embodiments in which the tip portion is relatively light in weight so that the spring or springs are able to bias the movable portion of the in an upward direction.

A composite portion of the spout, such as the spout extension portion 18 described here for the purposes of illustrating the composite construction, may include an upper wall, which may be substantially planar with substantially planar opposite surfaces although some curvature in the surfaces may be present. The spout extension portion may also include a pair of side walls 52, 53 that depend or extend downwardly from the upper wall 50. The side walls 52, 53 may be oriented substantially perpendicular to the upper wall, although this is not critical. The top and side walls generally define an interior 54 which may or may not be bounded by a bottom wall when viewed in a transverse cross section. The omission of a bottom wall contributes to a relative reduction of the weight of the extension portion as compared to inclusion of a bottom wall, and the momentum of the crop materials moving through the extension portion tends to keep the crop materials from falling out of the interior of the extension portion through the space where a bottom wall would be located if included. Each of the side walls 52, 53 may be substantially planar with substantially planar opposite surfaces.

The side walls 52, 53 may converge with the top wall 50 at joints 56, 57. The extension portion 18 may include joining elements 58, 59 configured to join the side walls 52, 53 to the top wall 50. The joining elements 58, 59 may be positioned at the joints 56, 57 between the walls 50, 52, 53 to hold the walls together. Each joining element may have a pair of longitudinally extending slots 60, 61 for receiving an edge portion of one of the walls, and the slots may be oriented substantially perpendicular to each other to support the walls in substantially perpendicular orientations with respect to each other. Illustratively, the joining elements may be formed from an aluminum extrusion, although this is not critical. Further, fittings 62 may be mounted on the ends of the spout extension portion to facilitate the mounting and interconnection of the various portions of the spout 10 together. The fittings may be formed of materials different from the materials forming, for example, the walls. Inserted structures or elements may also be positioned in the walls along the length of the walls to facilitate mounting of various components on the extension portion, and these inserted elements may also be formed of materials that are different from the materials forming the walls. The walls may have major opposite faces and edges.

The walls of the extension portion 18, such as the top 50 and side 52, 53 walls may be specially configured to minimize the weight of the spout extension portion. In some embodiments, the top and side walls may each include a celled structure 66 forming a core of the respective wall, and the celled structure may have cells 68 that open toward the major faces of the wall. The celled structure 66 may include cell walls 70 that extend substantially perpendicular to the major faces of the wall. Illustratively, the cell walls of the cells 68 may have a substantially hexagonal shape, and while this shape provides benefits in the amount of material required, this shape is not critical. In some of the most preferred embodiments, the cell walls 70 may comprise a meta-aramid material sold under the tradename NOMEX. Illustratively, the celled structure may have a thickness of approximately 0.5 inches, although other thicknesses may be used. Closed or open celled materials may be employed.

Further, the top and side walls may each include edge reinforcement structures 72 positioned along the edges of the walls and generally adjacent to the celled structure. The edge reinforcement structures 72 may comprise strips that extend along the edge of the wall that is positioned next to the celled structure 66 to form an edge face 74. The strip may be formed of a metal, and in some cases may be formed of aluminum such as an extrusion.

The top and side walls may each further include an outer skin 76 positioned over the cells 68 of the celled structure 66 to form the major faces of the walls on the outside or exterior of the walls. The skin 76 may extend between the edges of the respective wall, and may extend to the edge reinforcement structures 72 at the edges of the wall. The skin 76 may comprise a plastic material, and in some of the most preferred embodiments comprises a fiber reinforced plastic material. One highly suitable fiber-reinforced plastic material is a carbon fiber reinforced material. Optionally, although the carbon fiber material is preferred, other materials such as, for example, a high strength fiberglass or an aramid fiber material, such as the para-aramid is sold under the tradename KEVLAR, may be utilized for the outer skin.

The extension portion 18 may also include a sacrificial liner 78 positioned in the interior of the spout extension portion 16 to protect the interior surfaces of the walls against the abrasion caused by the crop materials moving through the extension portion. The liner 78 may substantially cover the inner surfaces of the top and side walls, and may be removable from the top and side walls and the interior when the protective function of the liner has been compromised and it is no longer able to protect the walls of the extension portion. The liner 78 may have an upper extent 80 and lateral extents 82 that extend substantially perpendicularly to the upper extent. The lateral extents 82 may be spaced from each other and may be positioned along opposite sides of the upper extent 80. In some embodiments, the liner 78 may be formed of an ultra high molecular weight (UHMW) plastic material. The respective extents of the liner may be separate pieces, or may be a single unitary piece formed by multiple pieces that are welded together to form the single unitary piece, a character which tends to solve the problem of the crop materials from entering and becoming trapped in the areas where the liner pieces meet together, such as at the corners of the liner.

In some embodiments, the spout base portion may be formed of a metal material, and the spout tip portion may also be formed of a metal. Illustratively, suitable grade of steel may be used to form the major panels of these portions. Optionally, the panels of the tip portion may be formed of a UHMW material which may significantly reduce the weight of the tip portion being supported at the end of the spout.

In other embodiments, a composite section of the spout, such as the extension portion 110, may have an optional configuration such as is shown in FIGS. 12 through 15. The optional configuration may include an upper wall 112, and a pair of side walls 114, 115 that form a channel shape with opposite free side edges 116, 117 on the respective side walls 114, 115, and the walls and edges may extend between the proximal end 118 to the distal end 119 of the extension portion.

One advantageous feature of the extension portion 110 is the enhancement of the strength of the side walls by a spine 120, 122 positioned at each of the side edges 116, 117 of the side walls, such that the side edges merge into the spines. The spines 120, 122 may have a thickness that is relatively thicker than the remainder of the side walls, and may be thicker than the thickness of the upper wall 112 as well. The thicker thickness of the spine may enhance the strength of the extension portion between the proximal and distal ends, and may allow the side and upper walls to be constructed of relatively thinner thickness material, as the supporting strength may be concentrated in the spines rather than the entire wall structure. The spines may be formed be wrapping or encasing a core 123 with the carbon fiber material used to form the walls. The core 123 may not contribute any significant strength to the spout portion, and may be formed of a different, lightweight material, such as extruded polystyrene, but may provide the mechanism for shaping the carbon fiber material of the spine into a tubular structure.

Figure 20:
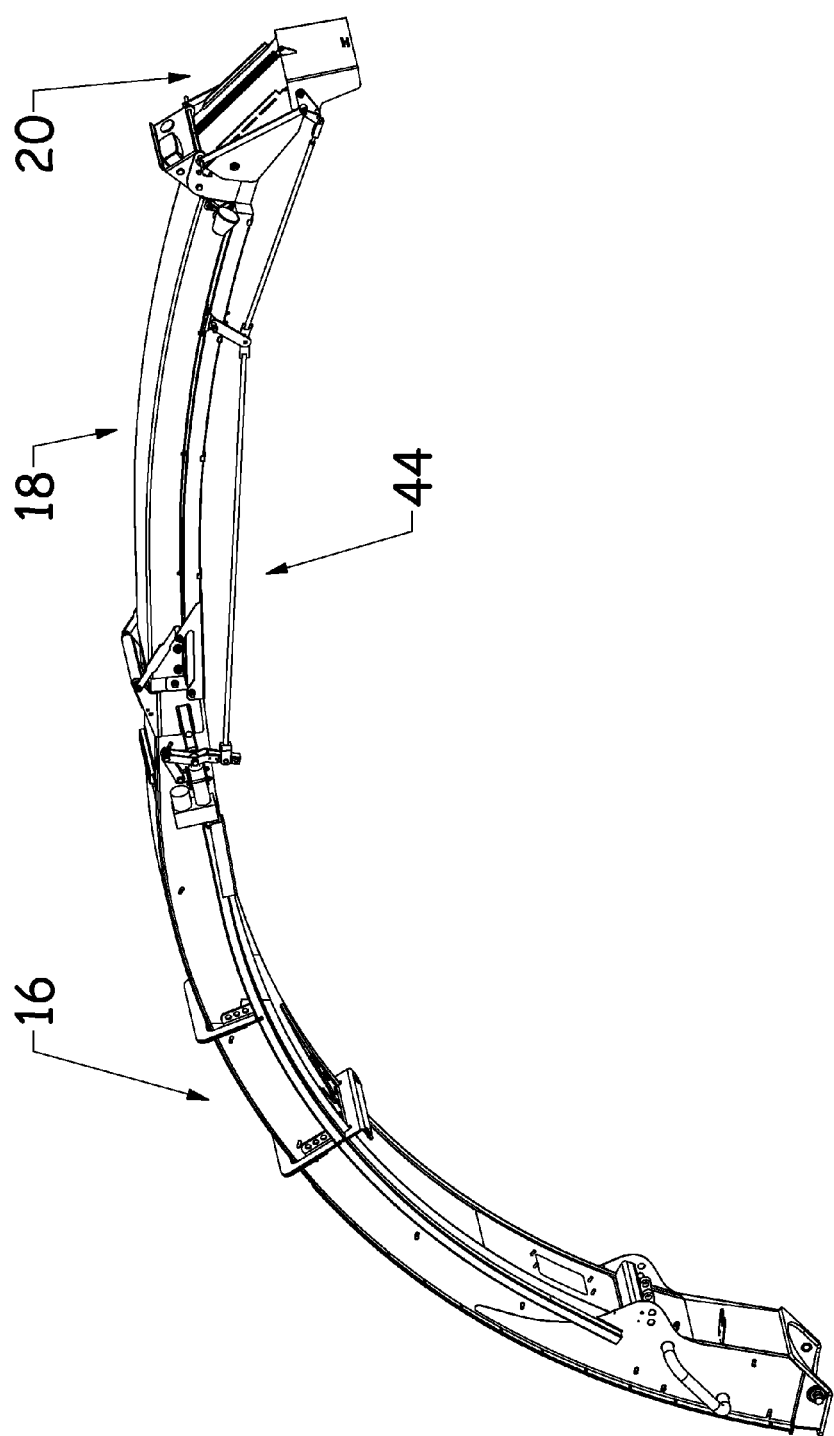
FIG. 20 is a schematic side perspective view of another illustrative embodiment of the extended harvester spout with optional features.
Figure 21:
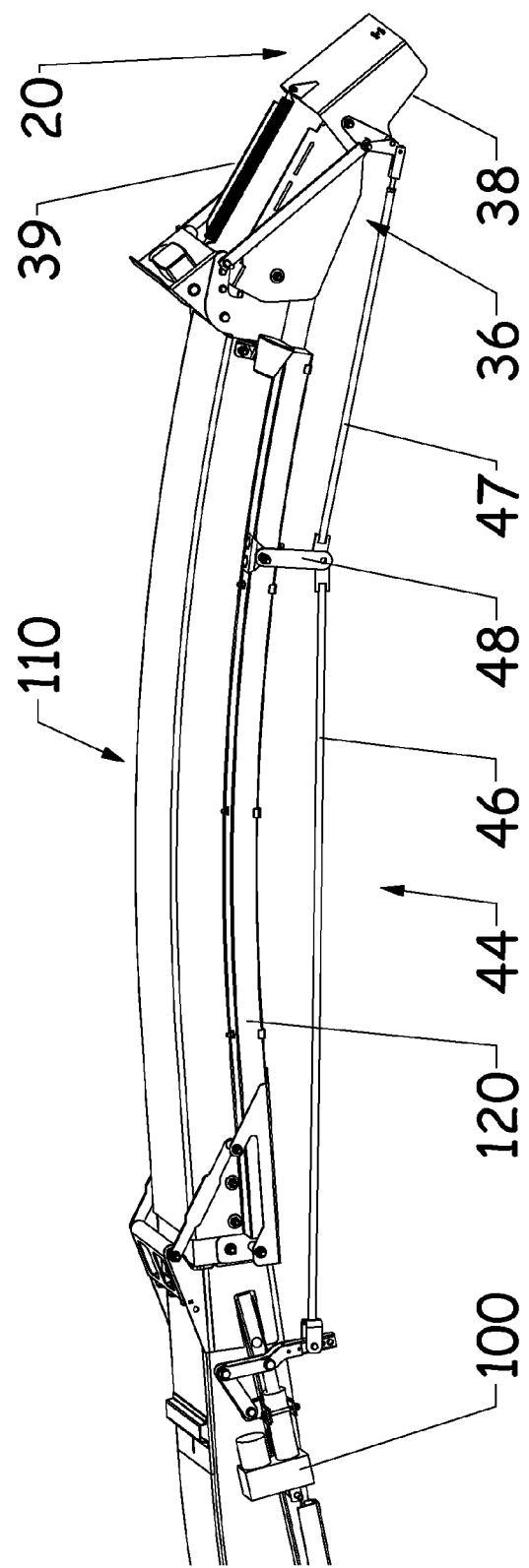
FIG. 21 is an enlarged schematic side perspective view of the embodiment shown in FIG. 20 showing greater detail of the extension portion of the embodiment.
Figure 22:
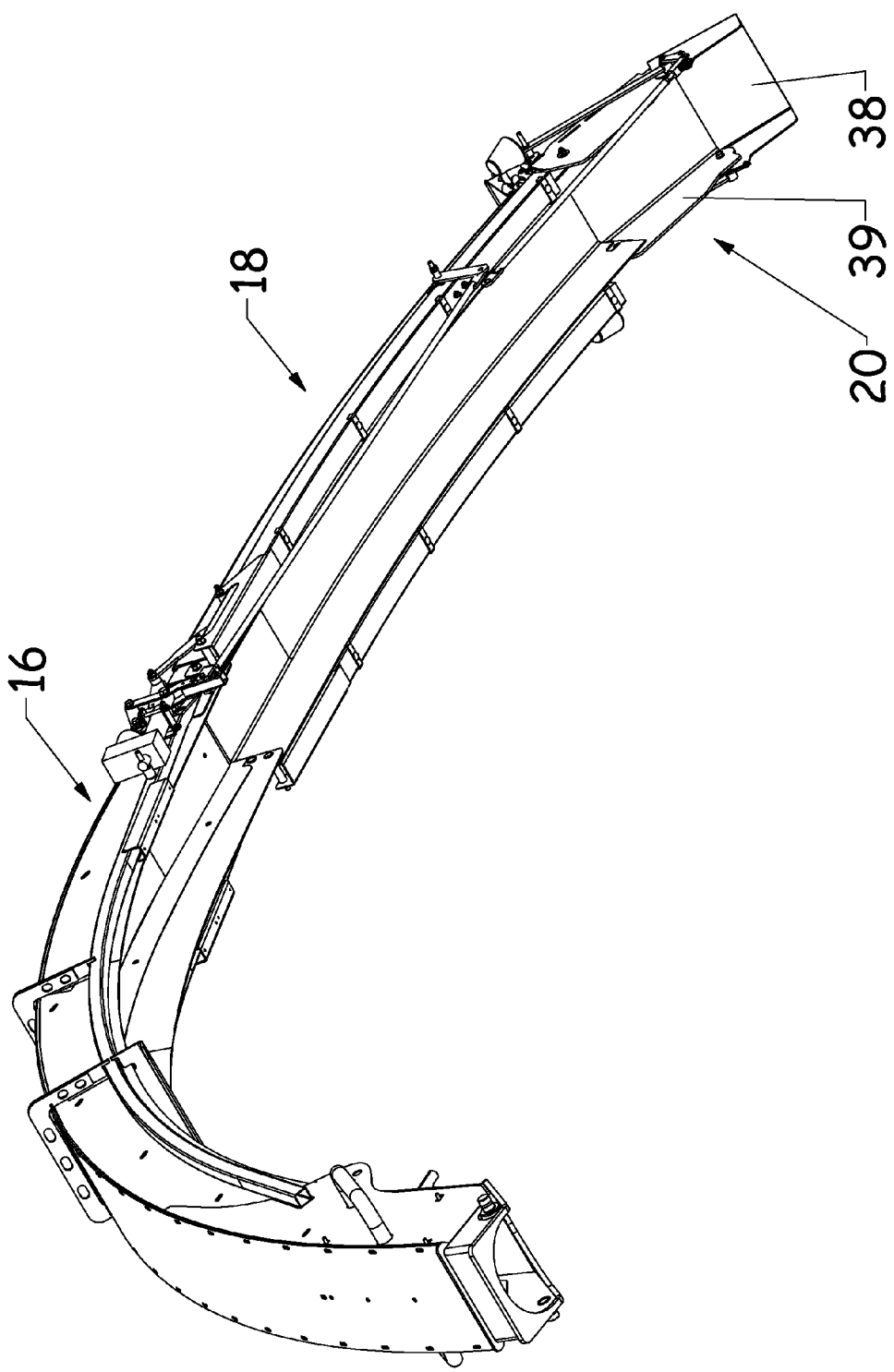
FIG. 22 is a schematic lower perspective view of the embodiment of FIG. 20.

The spines 120, 122 may also provide advantageous mounting locations for connecting other structures to the composite material of the extension portion without having to utilize inserts in the composite material. As an illustrative example, the mounting structure 124 employed at the proximal end 118 to mount the spout extension portion 110 to the spout base portion 16 may embrace or cradle portions of the spine and minimize or avoid the need to incorporate inserts into the walls of composite material to provide discrete mounting locations. The mounting structure 124 may include a pair of channel elements 126, 128 that are each positioned along a section of the spine 120, 122 and may be connected to the side walls by fasteners. The channel elements may compressively pinch the spines to a limited degree and may help to increase the area of the interface between the mounting structure and the spines. Such a relationship tends to eliminate discrete points of concentrated stress that might result from the use of fasteners solely. The channel elements 126, 128 may be connected together by a cross brace element 130 that spans between the spaced channel elements (and the spines) on either side of the extension portion. The cross brace element 130 is optional and may be omitted in some embodiments such as shown in the embodiment of FIGS. 20 through 22, as the brace may provide a location for crop materials to accumulate and possibly plug the passage of the spout. A link element 132 may be positioned on either side of the spout portion to span between one of the channel elements and the outer end of the spout base.

An optional embodiment of a sacrificial liner 140 is highly advantageous for addressing a tendency of the liner to bind in the spout portion and form a wavy surface due to dissimilar expansion rates between the material of the liner and the material of the spout portion. The differential in expansion rates can be especially large when, for example, the liner is formed of a UHMW material and the spout portion is formed of a composite material, such as carbon fiber. In the optional embodiment, the liner 140 is fixedly or rigidly mounted to the spout portion at one end of the spout portion and is mounted on the other, opposite end of the spout portion in a manner that permits longitudinal movement of the liner while limiting movement of the liner out of the interior of the spout portion. For example, as shown in FIG. 19, the liner 140 is mounted on the proximal end of the extension portion 110 in a manner that resists longitudinal and lateral movement of the liner with respect to the proximal end 118 of the liner, and this manner of attachment may be accomplished by forming holes 142 in the liner at the proximal end 118 for passing fasteners 144 through the liner to connect the liner to the proximal end of the extension portion. The opposite end of the liner may be mounted on the distal end 119 of the liner in a manner that permits a degree of longitudinal movement but resists lateral movement of the liner with respect to the distal end, and may be accomplished by forming slots 146 in the liner at the distal end 119 for passing fasteners through the liner to connect the liner to the distal end of the extension portion. Further, guides 148 may be located on the side edges 116, 117 or spines 120, 122 that help to keep the liner between the side walls without significantly constraining longitudinal movement of the liner with respect to the extension portion.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to which fall within the scope of the claims.

We claim:

1. A composite discharge spout portion for a discharge spout for a forage harvester defining at least a portion of a path for crop materials, the spout portion including:
    a proximal end, a distal end, and an upper wall and a pair of side walls extending between the proximal end and distal end, the side walls depending from the upper wall; and
    wherein a spine is integrated into each of the side walls and extends between the proximal and distal ends, each of the spines forming a tubular structure on either side of the spout portion;
    wherein the upper wall, the side walls and the spines are integrally formed of a composite material.

2. The composite spout portion of claim 1 wherein each of the spines is located on the respective side wall in a location substantially opposite of the upper wall.

3. The composite spout portion of claim 1 wherein the composite material has a cellular material with a skin of a fiber reinforced material.

4. The composite spout portion of claim 1 additionally comprising a sacrificial liner removably mounted in interior of the composite spout portion, the liner being fixedly mounted on a first end of the spout portion and being mounted on a second end of the spout portion in a manner that permits substantially free movement of the liner with respect to the upper and side walls in a longitudinal direction of the spout portion.

5. The composite spout portion of claim 4 wherein the liner is formed of an ultra high molecular weight plastic material.

6. The composite spout portion of claim 4 wherein the liner is formed of an upper extent for positioning adjacent to the upper wall, and lateral extents for positioning adjacent to the respective side walls, and wherein the extents are welded together to form an integral piece.

7. A discharge spout for a forage harvester having an exit conduit through which crop materials move, the spout comprising:
    a spout base portion forming an inboard end of the spout and being configured to mount on the forage harvester in communication with the exit conduit;
    a composite spout portion mounted on the spout base portion, the composite spout portion having a proximal end mounted on the base portion and a distal end, the composite spout portion includes an upper wall and a pair of side walls depending from the upper wall, the top and side walls having opposite major faces and edges;
    a spout tip portion mounted on the distal end of the composite spout portion and forming an outboard end of the discharge spout;
    wherein the composite spout portion includes a proximal end, a distal end, and an upper wall and a pair of side walls extending between the proximal end and distal end, the side walls depending from the upper wall;
    wherein a spine is integrated into each of the side walls and extends between the proximal and distal ends, each of the spines forming a tubular structure on either side of the spout portion;
    wherein the upper wall, the side walls and the spines of the composite spout portion are integrally formed of a composite material.

8. The discharge spout of claim 7 wherein each of the spines is located on the respective side wall in a location substantially opposite of the upper wall.

9. The discharge spout of claim 7 wherein the composite material has a cellular material with a skin of a fiber reinforced material.

10. The discharge spout of claim 7 additionally comprising a sacrificial liner removably mounted in interior of the composite spout portion, the liner being fixedly mounted on a first end of the spout portion and being mounted on a second end of the spout portion in a manner that permits substantially free movement of the liner with respect to the upper and side walls in a longitudinal direction of the spout portion.

11. The discharge spout of claim 10 wherein the liner is formed of an ultra high molecular weight plastic material.

12. The discharge spout of claim 10 wherein the liner is formed of an upper extent for positioning adjacent to the upper wall, and lateral extents for positioning adjacent to the respective side walls, and wherein the extents are welded together to form an integral piece.

* * * * *